(12) United States Patent
Yang et al.

(10) Patent No.: US 7,346,038 B2
(45) Date of Patent: Mar. 18, 2008

(54) METHOD FOR GENERATING 2D OVSF CODES IN MULTICARRIER DS-CDMA SYSTEMS

(75) Inventors: Guu-Chang Yang, Tai-Chung (TW); Chia-Ming Yang, Pan-Chiao (TW); Pei-Hsuan Lin, Ta-Li (TW)

(73) Assignee: Accton Technology Corporation, Hsin-Chu (TW)

( * ) Notice: Subject to any disclaimer, the term of this patent is extended or adjusted under 35 U.S.C. 154(b) by 1072 days.

(21) Appl. No.: 10/406,359

(22) Filed: Apr. 4, 2003

(65) Prior Publication Data

US 2003/0210648 A1 Nov. 13, 2003

Related U.S. Application Data

(63) Continuation-in-part of application No. 10/063,771, filed on May 11, 2002, now Pat. No. 7,197,007.

(51) Int. Cl.
*H04B 7/216* (2006.01)
(52) U.S. Cl. ............ 370/335; 370/208; 370/209; 370/342; 370/441; 375/130; 375/140; 375/148
(58) Field of Classification Search ............... 370/335, 370/208, 342, 209, 203, 441, 146; 375/147
See application file for complete search history.

(56) References Cited

U.S. PATENT DOCUMENTS

| | | | | |
|---|---|---|---|---|
| 6,009,091 A | * | 12/1999 | Stewart et al. | 370/342 |
| 6,091,757 A | * | 7/2000 | Cudak et al. | 375/130 |
| 6,130,884 A | * | 10/2000 | Sato | 370/335 |
| 6,233,231 B1 | * | 5/2001 | Felix et al. | 370/335 |
| 6,680,902 B1 | * | 1/2004 | Hudson | 370/210 |
| 6,707,841 B1 | * | 3/2004 | Takasaki | 375/130 |
| 6,747,947 B2 | * | 6/2004 | Kim et al. | 370/209 |

(Continued)

*Primary Examiner*—Marceau Milord
(74) *Attorney, Agent, or Firm*—Winston Hsu

(57) ABSTRACT

A multicarrier direct-sequence code-division multiple-access (MC-DS/CDMA) communications system is provided. A code tree of two-dimensional orthogonal variable spreading factor (2D-OVSF) codes is then generated for the system. To generate the code tree, a set of existing $M_1 \times N_1$ 2D-OVSF matrices, in the form of $A^{(i)}_{(M_1 \times N_1)}$ for $i = \{1, 2, \ldots, K_1\}$ is selected as seed matrices. $M_1$ represents the number of available frequency carriers in the MC-DS/CDMA system, and $N_1$ represents a spreading factor code length. Another set of existing $M_2 \times N_2$ 2D-OVSF matrices, in the form of $B_2^{(i)}_{(M_2 \times N_2)}$ for $i = \{1, 2, \ldots, K_2\}$ is then selected as mapping matrices. The mapping matrices are used to generate corresponding children matrices. These second layer child matrices are $M_1 M_2 \times N_1 N_2$ matrices with cardinality $K_1 K_2$, which are defined by reiterating the relationship:

$$C^{((i-1)K_2+1)}_{(M_1M_2 \times N_1N_2)} = B^{(1)}_{2(M_2 \times N_2)} \oplus A^{(i)}_{(M_1 \times N_1)}$$
$$C^{((i-1)K_2+2)}_{(M_1M_2 \times N_1N_2)} = B^{(2)}_{2(M_2 \times N_2)} \oplus A^{(i)}_{(M_1 \times N_1)}$$
$$\ldots$$
$$C^{((i-1)K_2+K_2)}_{(M_1M_2 \times N_1N_2)} = B^{(K_2)}_{2(M_2 \times N_2)} \oplus A^{(i)}_{(M_1 \times N_1)}$$

where $\oplus$ indicates a Kronecker product, and $i = 1, 2, 3, 4, \ldots, K_1$.

20 Claims, 7 Drawing Sheets

U.S. PATENT DOCUMENTS

| | | | |
|---|---|---|---|
| 6,885,653 B2 * | 4/2005 | Choi et al. | 370/342 |
| 6,885,691 B1 * | 4/2005 | Lyu | 375/130 |
| 6,907,060 B2 * | 6/2005 | Yang | 375/141 |
| 6,956,890 B2 * | 10/2005 | Lattuca et al. | 375/140 |
| 6,975,615 B1 | 12/2005 | Toskala et al. | |
| 7,054,294 B2 * | 5/2006 | Magnusson | 370/335 |
| 7,123,579 B1 * | 10/2006 | Lyu | 370/203 |
| 2002/0006156 A1 | 1/2002 | Relaiche | |
| 2002/0102981 A1 | 8/2002 | Jechoux | |
| 2003/0058788 A1 | 3/2003 | Kim et al. | |

* cited by examiner

| N=4 | | |
|---|---|---|
| M=2 | M=4 | M=8 |
| $A^{(1)}_{(2\times4)}$ $A^{(2)}_{(2\times4)}$ | $C^{(1)}_{1(4\times4)} = \begin{bmatrix} d_{11}A^{(1)}_{(2\times4)} \\ d_{12}A^{(2)}_{(2\times4)} \oplus \mu_1 \end{bmatrix}$ $C^{(2)}_{1(4\times4)} = \begin{bmatrix} d_{13}A^{(1)}_{(2\times4)} \\ d_{14}A^{(2)}_{(2\times4)} \oplus \mu_1 \end{bmatrix}$ $C^{(3)}_{1(4\times4)} = \begin{bmatrix} d_{21}A^{(2)}_{(2\times4)} \\ d_{22}A^{(1)}_{(2\times4)} \oplus \mu_2 \end{bmatrix}$ $C^{(4)}_{1(4\times4)} = \begin{bmatrix} d_{23}A^{(2)}_{(2\times4)} \\ d_{24}A^{(1)}_{(2\times4)} \oplus \mu_2 \end{bmatrix}$ | $C^{(1)}_{2(8\times4)} = \begin{bmatrix} d_{31}C^{(1)}_{1(4\times4)} \\ d_{32}C^{(2)}_{1(4\times4)} \oplus \mu_3 \end{bmatrix}$ $C^{(2)}_{2(8\times4)} = \begin{bmatrix} d_{33}C^{(1)}_{1(4\times4)} \\ d_{34}C^{(2)}_{1(4\times4)} \oplus \mu_3 \end{bmatrix}$ $C^{(3)}_{2(8\times4)} = \begin{bmatrix} d_{41}C^{(2)}_{1(4\times4)} \\ d_{42}C^{(1)}_{1(4\times4)} \oplus \mu_4 \end{bmatrix}$ $C^{(4)}_{2(8\times4)} = \begin{bmatrix} d_{43}C^{(2)}_{1(4\times4)} \\ d_{44}C^{(1)}_{1(4\times4)} \oplus \mu_4 \end{bmatrix}$ $C^{(5)}_{2(8\times4)} = \begin{bmatrix} d_{51}C^{(3)}_{1(4\times4)} \\ d_{52}C^{(4)}_{1(4\times4)} \oplus \mu_5 \end{bmatrix}$ $C^{(6)}_{2(8\times4)} = \begin{bmatrix} d_{53}C^{(3)}_{1(4\times4)} \\ d_{54}C^{(4)}_{1(4\times4)} \oplus \mu_5 \end{bmatrix}$ $C^{(7)}_{2(8\times4)} = \begin{bmatrix} d_{61}C^{(4)}_{1(4\times4)} \\ d_{62}C^{(3)}_{1(4\times4)} \oplus \mu_6 \end{bmatrix}$ $C^{(8)}_{2(8\times4)} = \begin{bmatrix} d_{63}C^{(4)}_{1(4\times4)} \\ d_{64}C^{(3)}_{1(4\times4)} \oplus \mu_6 \end{bmatrix}$ |

METHOD FOR GENERATING 2D OVSF CODES IN MULTICARRIER DS-CDMA SYSTEMS

CROSS-REFERENCE TO RELATED APPLICATION

This application is a continuation-in-part of U.S. application Ser. No. 10/063,771 filed on May 11, 2002, now U.S. Pat. No. 7,197,007 which is incorporated herein by reference.

1. FIELD OF THE INVENTION

The present invention relates to code-division multiple-access (CDMA) communications systems. More specifically relates to two-dimensional orthogonal variable spreading factor (2D-OVSF) codes, and a multirate scheme for a multicarrier direct-sequence CDMA system, are disclosed.

2. DESCRIPTION OF THE PRIOR ART

The enormous market penetration of second-generation (2G) mobile communications systems, and the promise of expanded features for these devices, has spurred the demands for transmission/reception strategies that are capable of ever-greater data transmission rates. This has lead to the development of so-called third-generation (3G) mobile communications, such as the 2 Mbps wideband code-division multiple-access (W-CDMA) service proposed by International Mobile Telecommunications 2000 (IMT-2000) body. CDMA technology is used in 3G mobile communications to provide wideband services in a flexible manner. Through spectrum spreading, CDMA systems offer spectrum reuse, multipath resistance, frequency diversity, and interference rejection.

To support both high-speed and multirate data services, two approaches are used in an IMT-2000 W-CDMA system: variable-length spreading and multicode techniques. Variable-length spreading CDMA uses multiple spreading factors for multirate transmissions, whereas multicode CDMA allocates multiple codes to high data rate services. The two-layered spreading method is used in W-CDMA to provide mutual orthogonality between users of the same cell, while maintaining mutual randomness between users of different cells. The two-layered spreading method has two parts. The first is channelization, which transforms every data symbol into a predetermined number of chips. The number of chips per data symbol is termed the spreading factor. Orthogonal variable spreading factor (OVSF) codes are employed as channelization codes to ensure orthogonality between different downlink channels. The second part is scrambling. Each user in the same cell uses the same scrambling code to provide randomness (or, rather, pseudo-randomness) between users of different cells. Orthogonal variable spreading factor (OVSF) codes cannot maintain orthogonality among users in the uplink channels. Therefore, users in the same cell use different scrambling codes to provide randomness and orthogonality in uplink channels.

Figure 1A:
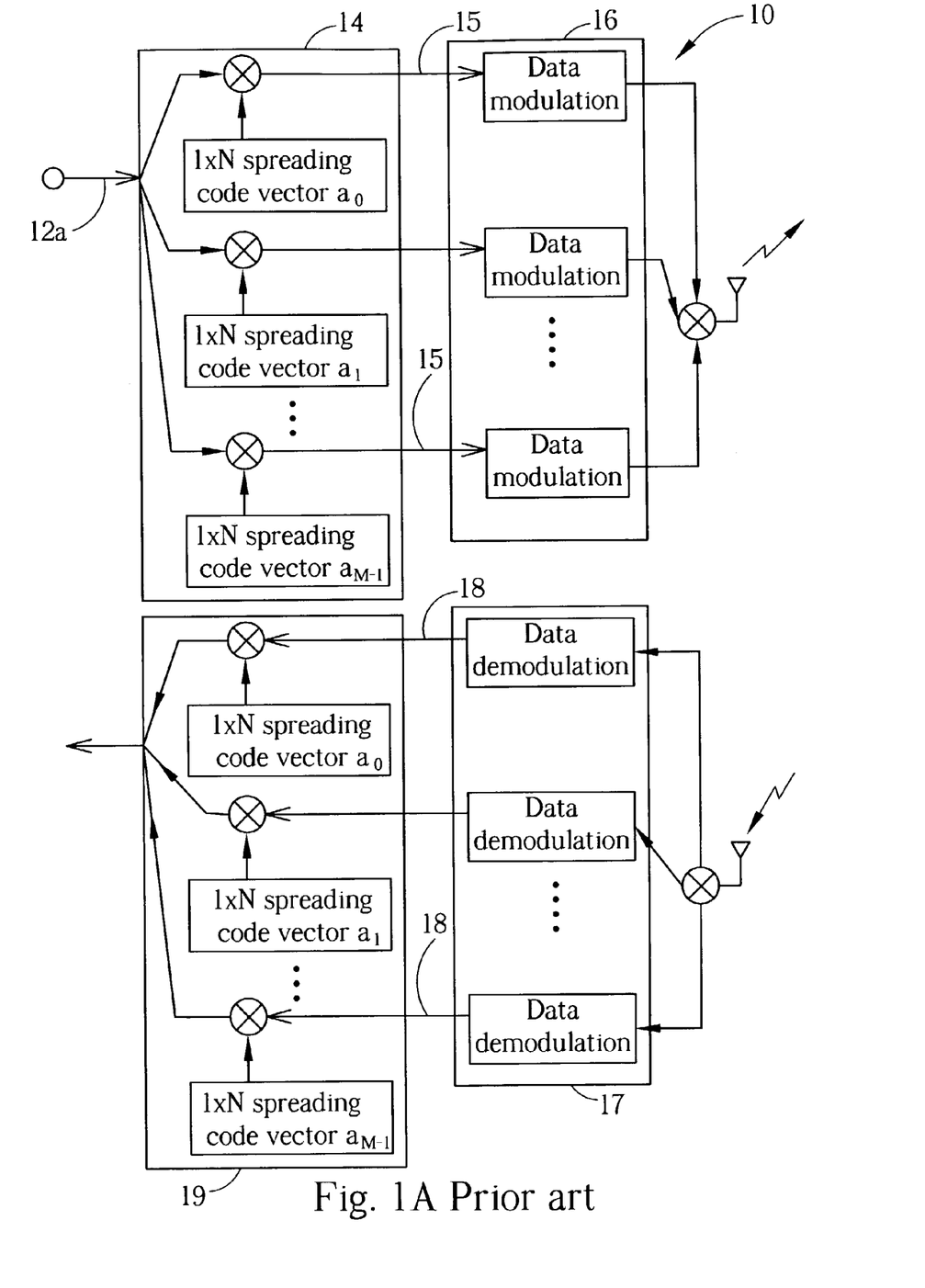
FIG. 1A is a simple block diagram of a MC-DS/CDMA communications system according to the prior art.
Figure 1B:
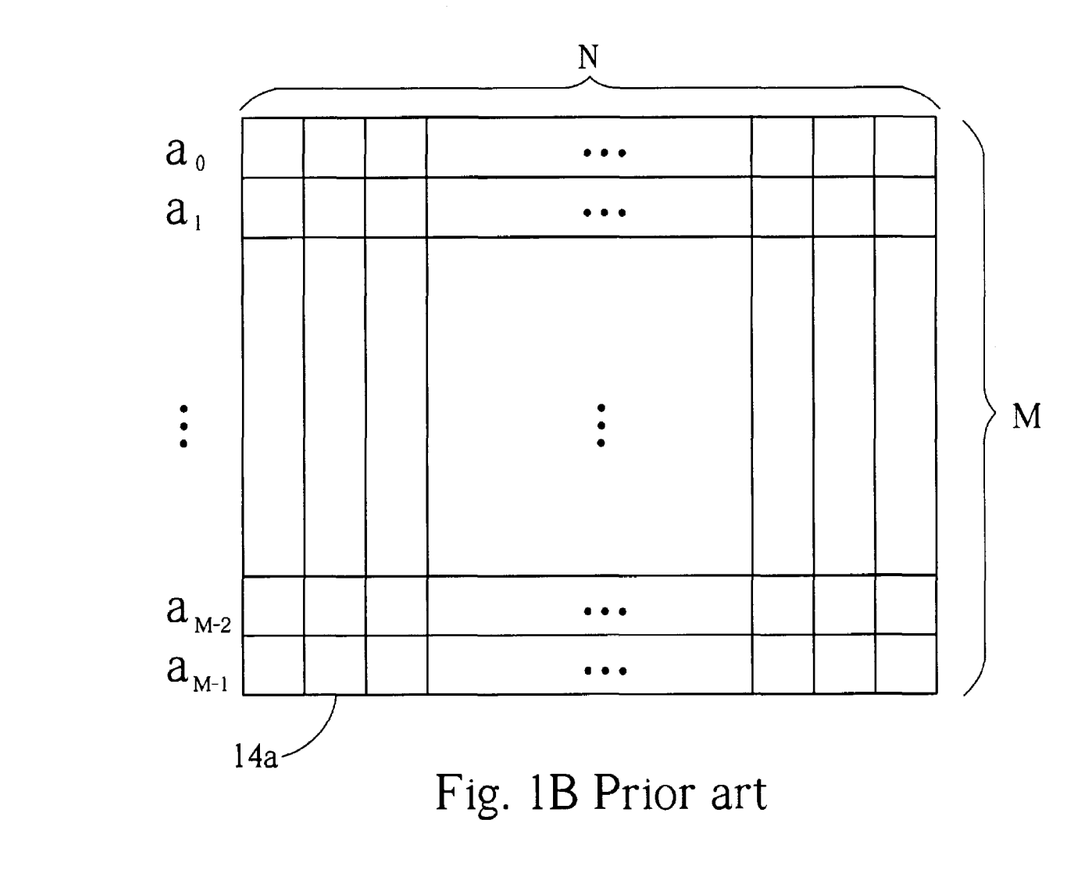
FIG. 1B illustrates an M×N spreading code matrix utilized by the communications system.

However, for even greater data transmission capabilities, multicarrier direct-sequence CDMA (MC-DS/CDMA) systems have been proposed. MC-DS/CDMA communications systems using orthogonal spreading codes have an advantage in that they minimize multiple-access interference (MAI), which is one of the primary sources of interference in CDMA systems. By reducing MAI, greater transmission data rates are made possible. Each user in a MC-DS/CDMA system is assigned a distinct two-dimensional (2D) spreading code sequence in the form of a matrix, which serves as the signature sequence for the user. The number of columns in the matrix indicates the spreading factor utilized (i.e., the number of chips per data symbol). The number of rows in the matrix indicates the number of frequency carriers in the MC-DS/CDMA system. Each row of the matrix is transmitted along different frequency carriers. It is possible to construct a class of 2D spreading code matrices for MC-DS/CDMA systems that exhibit cyclic autocorrelation sidelobes and cyclic cross-correlation functions that are at most zero at all times. As MAI is primarily the result of non-zero cross-correlation functions of simultaneously transmitting users, by providing such unique spreading code matrices, MAI can be significantly reduced in MC-DS/CDMA communications systems. Please refer to FIG. 1A and FIG. 1B. FIG. 1A is a simple block diagram of a MC-DS/CDMA communications system 10 according to the prior art. FIG. 1B illustrates a M×N spreading code matrix 14a utilized by the communications system 10. Input data 12a feeds into a multiplier 14, which spreads the spectrum through the assignment of unique 'signature' M×N spreading code matrix 14a. Data after spreading spectrum 15 is then fed into a multicarrier modulation unit 16 and transmitted. On a receiver side, a multicarrier demodulation unit 17 receives the transmitted signal and demodulates it to generate the demodulated data 18. A multiplier 19 multiplies the data 18 by the same M×N spreading code matrix 14a to generate output data 12b. Typically, the M×N spreading code matrices of all users are identical, and ideally the output data 12b should match the input data 12a.

To date, however, MC-DS/CDMA spreading code matrices have been very limited in form, being M×N with the following restrictions:

1) $M=N=2^k$, with $k \geq 1$, or
2) $M=2^k$, and $N=M^2$, with $k \geq 1$.

This places a corresponding restriction on MC-DS/CDMA communications systems that severely limits the potential flexibility of these systems as regards data transmission parameters.

SUMMARY OF THE INVENTION

It is therefore a primary objective of this invention to provide multicarrier direct-sequence code-division multiple-access (MC-DS/CDMA) communications systems that have the ability to generate, and hence use, generalized two-dimensional (2D) orthogonal variable spreading factor (2D-OVSF) codes by using existing 2D-OVSF codes. The generalized 2D-OVSF codes have the form of an M×N matrix where $M=M_1 \times M_2$, $N=N_1 \times N_2$, and are generated from existing $M_1 \times N_1$ and $M_2 \times N_2$ 2D-OVSF matrices. The $M_1 \times N_1$ matrix has cardinality $k_1$, the $M_2 \times N_2$ matrix has cardinality $k_2$, and the M×N matrix has cardinality $k_1 \times k_2$.

Briefly summarized, the preferred embodiment of the present invention discloses a method for wireless communications. A multicarrier direct-sequence code-division multiple-access (MC-DS/CDMA) communications system is provided. A code tree of two-dimensional orthogonal variable spreading factor (2D-OVSF) codes is then generated for the system. Each node of the code tree has a corresponding matrix that is representative of a spreading code sequence. To generate the code tree, a set of existing $M_1 \times N_1$ 2D-OVSF matrices, in the form of $A^{(i)}_{(M_1 \times N_1)}$ for $i=\{1, 2, \ldots, K_1\}$ is selected as seed matrices. Each seed matrix has a corresponding progenitor node in the code tree (i.e., the seed matrices correspond to the first generation nodes). $M_1$ represents the number of available frequency carriers in the MC-DS/CDMA system, and $N_1$ represents a spreading factor code length. Another set of existing $M_2 \times N_2$ 2D-OVSF matrices, in the form of $$B^{(i)}_{2(M_2 \times N_2)}$$

for i={1, 2, ..., $K_2$} is then selected as mapping matrices. The mapping matrices are used to generate corresponding children nodes of the progenitor nodes. These second layer children nodes contain the $M_1M_2 \times N_1N_2$ matrices with cardinality $K_1K_2$, which are defined by reiterating the relationship:

$$C^{((i-1)K_2+1)}_{(M_1M_2 \times N_1N_2)} = B^{(1)}_{2(M_2 \times N_2)} \oplus A^{(i)}_{(M_1 \times N_1)}$$
$$C^{((i-1)K_2+2)}_{(M_1M_2 \times N_1N_2)} = B^{(2)}_{2(M_2 \times N_2)} \oplus A^{(i)}_{(M_1 \times N_1)}$$
$$...$$
$$C^{((i-1)K_2+K_2)}_{(M_1M_2 \times N_1N_2)} = B^{(K_2)}_{2(M_2 \times N_2)} \oplus A^{(i)}_{(M_1 \times N_1)}$$

where $\oplus$ indicates a Kronecker product, and i=1, 2, 3, 4, ..., $K_1$.

It is an advantage that the present invention provides a new class of 2D-OVSF codes that offers greater variability between the relative dimensions of the columns and rows of the associated matrices, and hence permits a MC-DS/CDMA system greater flexibility in the choice of the number of carrier frequencies and utilized spreading factor.

It is a further advantage of the present invention that the 2D-OVSF codes can be generated recursively by using a tree structure that is analogous to 1D-OVSF codes. Similarly, multirate transmissions can be completed by variable-length spreading and multicode techniques when 2D OVSF codes as obtained by the present invention are used in MC-DS/CDMA systems.

It is yet another advantage that the present invention 2D-OVSF codes possess zero cyclic auto-correlation and cross-correlation properties. The present invention 2D OVSF codes are thus capable of remaining orthogonal in asynchronous channels, and so a two-layered spreading technique is not necessarily needed.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

By using one set of $M_1 \times N_1$ two-dimensional orthogonal variable spreading factor (2D-OVSF) matrices (with cardinality $K_1$) and another set of $M_2 \times N_2$ 2D-OVSF orthogonal matrices (with cardinality $K_2$), it is to construct $M_1M_2 \times N_1N_2$ 2D-OVSF orthogonal matrices (having cardinality $K_1K_2$) where $M_1$, $N_1$, $M_2$, $N_2$, $K_1$ and $K_2$ are positive integers.

A code tree of these generalized 2D-OVSF codes then is generated for an MC-DS/CDMA system. Each node of the code tree has a corresponding matrix that is representative of a spreading code sequence. Initially, a set of existing $M_1 \times N_1$ 2D-OVSF matrices, $A^{(i)}_{(M_1 \times N_1)}$, is provided as seed matrices, where i={1, 2, ..., $K_1$}, $M_1$ represents the number of available frequency carriers in the MC-DS/CDMA system, and $N_1$ represents a spreading factor code length. $K_1$ is 2. Each seed matrix is assigned to a corresponding progenitor node in the code tree. The progenitor nodes serve as the first generation nodes in the code tree, and hence as the root structure of the code tree. All subsequent generation nodes in the code tree, with their corresponding 2D-OVSF matrices, are descendents of these progenitor nodes. Another set of existing $M_2 \times N_2$ matrices, $$B^{(i)}_{2(M_2 \times N_2)},$$

which are also existing 2D-OVSF matrices, is then provided as mapping matrices, where i={1, 2, ..., $K_2$}. $K_2$ is 2. The seed matrices $\{A^{(1)}_{(M_1 \times N_1)}, A^{(2)}_{(M_1 \times N_1)}, ..., A^{(K_1)}_{(M_1 \times N_1)}\}$ and the mapping matrices $$\{B^{(1)}_{2(M_2 \times N_2)}, B^{(2)}_{2(M_2 \times N_2)}, ..., B^{(K_2)}_{2(M_2 \times N_2)}\}$$

are used to generate the associated matrices of the children nodes of the progenitor nodes. The second layer children nodes (that is, the immediate children of the progenitor nodes) contain the $M_1M_2 \times N_1N_2$ matrices with cardinality $K_1K_2$, which are defined by reiterating the relationship:

$$C^{((i-1)K_2+1)}_{(M_1M_2 \times N_1N_2)} = B^{(1)}_{2(M_2 \times N_2)} \oplus A^{(i)}_{(M_1 \times N_1)}$$
$$C^{((i-1)K_2+2)}_{(M_1M_2 \times N_1N_2)} = B^{(2)}_{2(M_2 \times N_2)} \oplus A^{(i)}_{(M_1 \times N_1)}$$
$$...$$
$$C^{((i-1)K_2+K_2)}_{(M_1M_2 \times N_1N_2)} = B^{(K_2)}_{2(M_2 \times N_2)} \oplus A^{(i)}_{(M_1 \times N_1)}$$

where $\oplus$ indicates a Kronecker product, and i=1, 2, 3, 4, ..., $K_1$.

Computing the subsequent generations of matrices in the code tree proceeds in a similar vein. For example, to find the matrices for nodes that are the immediate children of the above child nodes (that is, the immediate grandchildren of the progenitor nodes), the original seed matrices are replaced by the child matrices $\{C^{(1)}{}_{(M_1M_2 \times N_1N_2)}, C^{(2)}{}_{(M_1M_2 \times N_1N_2)}, \ldots, C^{(K_1K_2)}{}_{(M_1M_2 \times N_1N_2)}\}$, which have cardinality $K_1K_2$. Another set of 2D-OVSF mapping matrices $$\{B^{(1)}_{3(M_3 \times N_3)}, B^{(2)}_{3(M_3 \times N_3)}, \ldots, B^{(K_3)}_{3(M_3 \times N_3)}\}$$

is then provided, having cardinality $K_3$. The $K_3$ is 2.

At this second generation layer (grandchild layer) the associated 2D-OVSF matrices for the grandchild nodes are defined by reiterating the relationship:

$$C^{((i-1)K_3+1)}_{(M_1M_2M_3 \times N_1N_2N_3)} = B^{(1)}_{3(M_3 \times N_3)} \oplus C^{(i)}_{(M_1M_2 \times N_1N_2)}$$

$$C^{((i-1)K_3+2)}_{(M_1M_2M_3 \times N_1N_2N_3)} = B^{(2)}_{3(M_3 \times N_3)} \oplus C^{(i)}_{(M_1M_2 \times N_1N_2)}$$

$$\ldots$$

$$C^{((i-1)K_3+K_3)}_{(M_1M_2M_3 \times N_1N_2N_3)} = B^{(K_3)}_{3(M_3 \times N_3)} \oplus C^{(i)}_{(M_1M_2 \times N_1N_2)}$$

where $\oplus$ indicates a Kronecker product, and $i=1, 2, 3, 4, \ldots, K_1K_2$.

It should be clear that by using the method repeatedly, and by selectively using various mapping matrices at each layer, $$\{B^{(1)}_{2(M_2 \times N_2)}, B^{(2)}_{2(M_2 \times N_2)}, \ldots, B^{(K_2)}_{2(M_2 \times N_2)}\},$$

$$\{B^{(1)}_{3(M_3 \times N_3)}, B^{(2)}_{3(M_3 \times N_3)}, \ldots, B^{(K_3)}_{3(M_3 \times N_3)}\}, \ldots,$$

$$\{B^{(1)}_{p(M_p \times N_p)}, B^{(2)}_{p(M_p \times N_p)}, \ldots, B^{(K_p)}_{p(M_p \times N_p)}\},$$

matrices associated with child nodes at the $p_{th}$ layer $\{C^{(1)}{}_{(M_1M_2 \ldots M_p \times N_1N_2 \ldots N_p)}, C^{(2)}{}_{(M_1M_2 \ldots M_p \times N_1N_2 \ldots N_p)}, \ldots, C^{(K_1K_2 \ldots K_p)}{}_{(M_1M_2 \ldots M_p \times N_1N_2 \ldots N_p)}\}$ is constructed.

Note that the choice of mapping matrices is quite free, requiring only the mapping matrices are 2D-OVSF matrices—which means orthogonal. The initial choice of seed matrices, being associated with the progenitor nodes, is chosen at will, but subject to the restriction of being 2D-OVSF matrices. Seed matrices for subsequent generations, however, are restricted, being given by the matrices associated with the nodes of the particular generation layer for which children nodes are being constructed. In particular, though, it is possible for all sets of mapping matrices to be the same and equal to the set of initial seed matrices. As an example, consider the case where $M_1=M_2= \ldots =M_p=2$, $N_1=N_2= \ldots =N_p=2$, $K_1=K_2= \ldots K_p=2$, and $$\{A^{(1)}_{(2 \times 2)}, A^{(2)}_{(2 \times 2)}\} = \{B^{(1)}_{(2 \times 2)}, B^{(2)}_{(2 \times 2)}\} = \left\{ \begin{bmatrix} ++ \\ +- \end{bmatrix}, \begin{bmatrix} +- \\ ++ \end{bmatrix} \right\}.$$

Here, and in the following, the symbol "+" is used to represent +1, and the symbol "−" is used to represent −1. For the above example, reiteration of the above method yield subsequent generation nodes that have associated M×N 2D-OVSF matrices in which $M=2^k$ and $N=2^l$, $k>0$, and $l>0$.

Figure 2:
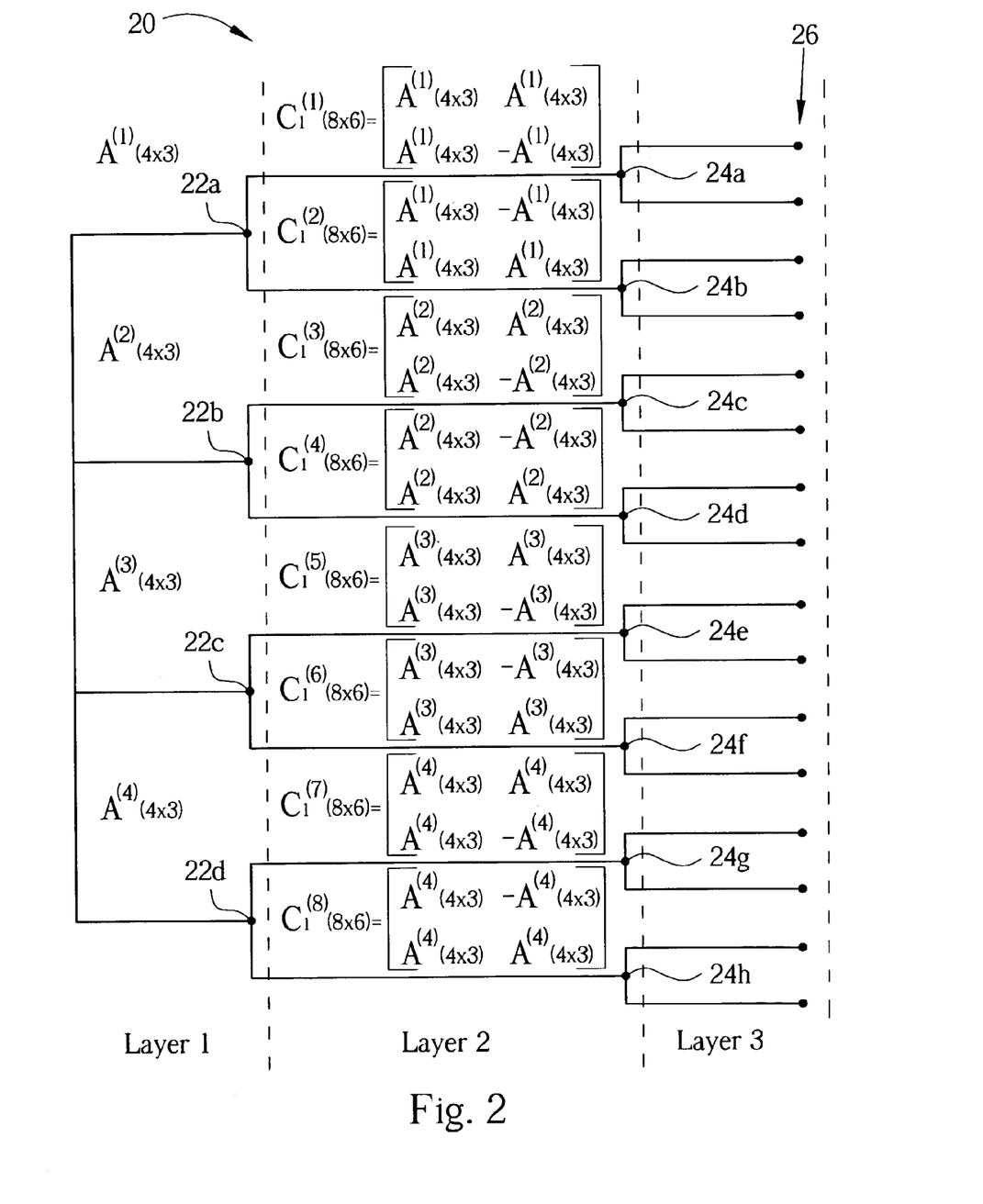
FIG. 2 illustrates a portion of a code tree of two-dimensional orthogonal variable spreading factor (2D-OVSF) codes according to the embodiment of the invention.

Please refer to FIG. 2. FIG. 2 illustrates a portion of an example code tree 20 of 2D-OVSF codes according to the embodiment of the invention. A set of initial 4×3 2D-OVSF seed matrices is first provided, $A^{(i)}{}_{(4 \times 3)}$, with a cardinality of 4 so that "i" ranges from 1 to 4. Specifically, the provided seed matrices $A^{(i)}{}_{(4 \times 3)}$ are:

$$A^{(1)}_{(4 \times 3)} = \begin{bmatrix} +-+ \\ ++- \\ +++ \\ ++- \end{bmatrix}, A^{(2)}_{(4 \times 3)} = \begin{bmatrix} -++ \\ --- \\ -++ \\ -+- \end{bmatrix}, A^{(3)}_{(4 \times 3)} = \begin{bmatrix} -++ \\ -+- \\ +-- \\ +++ \end{bmatrix}, A^{(4)}_{(4 \times 3)} = \begin{bmatrix} +++ \\ ++- \\ -+- \\ --+ \end{bmatrix}$$

Each seed matrix $A^{(i)}{}_{(4 \times 3)}$ is associated with a respective progenitor node 22a-22d. A set of 2D-OVSF mapping matrices $B^{(i)}{}_{(2 \times 2)}$ is then provided. In this case, the mapping matrices $B^{(i)}{}_{(2 \times 2)}$ provided have a cardinality of 2, so that i=1, 2, and are shown below:

$$B^{(1)}_{(2 \times 2)} = \begin{bmatrix} ++ \\ +- \end{bmatrix}, B^{(2)}_{(2 \times 2)} = \begin{bmatrix} +- \\ ++ \end{bmatrix}$$

With the set of seed matrices, $A^{(i)}{}_{(4 \times 3)}$, and the set of mapping matrices $B^{(i)}{}_{(2 \times 2)}$, a code tree with generalized 2D orthogonal M×N codes with $M=4(2)^{k-1}$, $N=3(2)^{k-1}$ at the $k_{th}$ layer can be constructed. It is assumed in this example that the same mapping matrices $B^{(i)}{}_{(2 \times 2)}$ are used to generate each layer, but this does not need to be the case. As the mapping matrices $B^{(i)}{}_{(2 \times 2)}$ have a cardinality of 2, there will be two child matrices associated with each parent matrix. That is, each node in the code tree 20 will support two child nodes. To generate the layer 2 (k=2) child matrices $C_1^{(i)}{}_{(8 \times 6)}$ associated with each child node 24a-24h of the progenitor nodes 22a-22d, the reiterative relationship discussed above is employed. For example, to find the respective matrices $C_1^{(1)}{}_{(8 \times 6)}$ and $C_1^{(2)}{}_{(8 \times 6)}$ of the child nodes 24a and 24b, the matrix of the parent node 22a is used as the seed matrix. The seed matrix for child nodes 24a and 24b is thus $A^{(i)}{}_{(4 \times 3)}$, and the respective child node 24a, 24b matrices are given by:

$$C_1^{(1)}{}_{(8 \times 6)} = B^{(1)}{}_{(2 \times 2)} \oplus A^{(1)}{}_{(4 \times 3)}$$

$$C_1^{(2)}{}_{(8 \times 6)} = B^{(2)}{}_{(2 \times 2)} \oplus A^{(1)}{}_{(4 \times 3)}$$

Similarly, for the next progenitor node 22b with associated matrix $A^{(2)}{}_{(4 \times 3)}$, the respective child matrices $C_1^{(3)}{}_{(8 \times 6)}$ and $C_1^{(4)}{}_{(8 \times 6)}$ of the child nodes 24c and 24d are given by:

$$C_1^{(3)}{}_{(8 \times 6)} = B^{(1)}{}_{(2 \times 2)} \oplus A^{(2)}{}_{(4 \times 3)}$$

$$C_1^{(4)}{}_{(8 \times 6)} = B^{(2)}{}_{(2 \times 2)} \oplus A^{(2)}{}_{(4 \times 3)}$$

The above steps can be repeated to obtain all of the layer 2 matrices associated with the child nodes 24a-24h, and which are explicitly depicted in FIG. 2. The general formula for the child matrices $C_1^{(i)}{}_{(8 \times 6)}$ is clear from the above reiterative formulas, and given by:

$$C_1^{((i-1)2+j)}{}_{((4 \times 2) \times (3 \times 2))} = B^{(j)}{}_{(2 \times 2)} \oplus A^{(i)}{}_{(4 \times 3)} \quad \text{(Eqn.1)}$$

In Eqn.1, the term "i" runs from 1 to 4, and indicates the parent node 22a-22d being considered. For each value of "i", the term "j" runs from 1 to 2, and indicates the particular child node matrix being defined for the parent node by "i".

To find the matrices for layer 3, the above process is repeated, but the seed matrices used are obtained from layer 2, rather than layer 1. The same mapping matrices $B^{(i)}{}_{(2 \times 2)}$ may be used. For layer 3, the general formula for the matrices associated with the grandchild nodes 26 would be:

$$C_2^{((i-1)2+j)}{}_{((8 \times 2) \times (6 \times 2))} = B^{(j)}{}_{(2 \times 2)} \oplus C_1^{(i)}{}_{(8 \times 6)} \quad \text{(Eqn.2)}$$

In Eqn.2, the term "i" runs from 1 to 8, and indicates the child node 24*a*-24*h* being considered. For each value of "i", the term "j" runs from 1 to 2, and indicates the particular grandchild node matrix being defined for the child node by "i".

From the above, a binary-like code tree of 2D-OVSF codes is generated. Although the simplest case of a 2×2 mapping matrices is explicitly discussed, it should be clear that any type of generalized M×N mapping matrices may be used, leading to code trees that are not necessarily binary in structure, but rather having 3 or more branches per node. Furthermore, as the mapping matrices may be changed from layer to layer, each generation of the tree does not have to support the same number of children as subsequent or previous generations. The orthogonality in the embodiment includes "even" and "odd" zero cyclic auto- and cross-correlation properties. The definitions of "even" and "odd" are based on the transmission pattern of two consecutive data bits. While the former represents the case of a "+1" followed by another "+1" (or a "−1" followed by another "−1"), the latter is for the case of a "+1" followed by a "−1" or vice versa.

When the number of frequency carriers in a communication system increases, it is necessary to increase the number of rows in a previously obtained 2D-OVSF code matrix while retaining the same number of columns (i.e., retaining the code size, while increasing the number of frequency carriers). The embodiment provides two ways in which to construct such fixed-length 2D-OVSF codes, and they are discussed in the following. However, prior to this discussion, it is necessary to introduce the concept of a matrix modulus function "$\oplus$". The modulus function "$\oplus$" is similar to a binary "roll right" or "roll left" operation, rolling the columns of a matrix around to the right or left. As an example, consider a matrix $A^{(1)}_{(2 \times 4)}$:

$$A^{(1)}_{(2\times 4)} = \begin{bmatrix} + & + & + & - \\ + & - & + & + \end{bmatrix} = [v1 \quad v2 \quad v3 \quad v4],$$

where "v1", "v2", "v3" and "v4" are the column vectors of $A^{(1)}_{(2\times 4)}$. $A^{(1)}_{(2\times 4)\oplus 1} = [v4 \ v1 \ v2 \ v3]$. That is, all column vectors right shift by 1, and column vector "v4" rolls around from the rightmost column position to the leftmost column position. $A^{(1)}_{(2\times 4)\oplus(-1)} = [v2 \ v3 \ v4 \ v1]$, so that all column vectors shift left by 1, with column vector "v1" rolling around from the leftmost column position to the rightmost column position. Of course, it is to perform the modulus operator with absolute values greater than one. That is to perform $A^{(1)}_{(2\times 4)\oplus 3} = [v2 \ v3 \ v4 \ v1]$, which for this example is identical to $A^{(1)}_{(2\times 4)\oplus(-1)}$.

The first method (termed method "A") used to construct fixed-length 2D-OVSF codes begins by providing initial 2D-OVSF matrices $A^{(1)}_{(2\times N)}$ and $A^{(2)}_{(2\times N)}$. These matrices serve as the matrices that are associated with the progenitor nodes of the 2D-OVSF code tree. Next, a particular set D of 2×2 matrices is provided, where D={$D_1, D_2, \ldots$}. Each matrix $D_j$ in the set D has the form:

$$D_j = \begin{bmatrix} d_{j1} & d_{j3} \\ d_{j2} & d_{j4} \end{bmatrix}$$

Each element of $D_j$ ($d_{j1}, d_{j2}, d_{j3}$ and $d_{j4}$) is either +1 or −1. Furthermore, the elements of $D_j$ must obey the relationship:

$$d_{j1}d_{j3} + d_{j2}d_{j4} = 0$$

Hence, the set D is by no means a set of infinite size. The particular ordering of an element $D_i$ within D with respect to another element $D_j$ within D is of no importance. That is, the elements in D is ordered in any fashion, so long as they conform to the above requirements.

To construct the fixed-length 2D-OVSF code tree according to method "A", the following iterative relationships are employed:

$$C^{(2i-1)}_{(2M\times N)} = \begin{bmatrix} d_{j1}A^{(i)}_{(M\times N)} \\ d_{j2}A^{(i)}_{(M\times N)\oplus \mu_i} \end{bmatrix}, \quad (\text{Eqn.3A})$$

$$C^{(2i)}_{(2M\times N)} = \begin{bmatrix} d_{j3}A^{(i)}_{(M\times N)} \\ d_{j4}A^{(i)}_{(M\times N)\oplus \mu_i} \end{bmatrix}, \quad (\text{Eqn.3B})$$

where $i \in \{1, 2, 3, \ldots, M\}$, and every $\mu_i$ at the same layer in the code tree must be all even or all odd integers (that is, $\mu_i \in \{0, 2, 4, \ldots, (N-2)\}$ or $\mu_i \in \{1,3,5,\ldots,(N-1)\}$). The elements $d_{j1}, d_{j2}, d_{j3}$ and $d_{j4}$ in Eqns. 3A and 3B are taken from a matrix $D_j$ from the set of matrices D. As in the previous example, the term "i" indicates, within a layer of the code tree, the matrix of the parent node $A^{(i)}_{(M\times N)}$ for which two children (one from Eqn. 3A, the other from Eqn. 3B) are being defined.

To exemplify the above, consider the following initial progenitor matrices (that is, matrices associated with the progenitor nodes at layer 1 in the code tree):

$$A^{(1)}_{(2\times 4)} = \begin{bmatrix} + & + & + & - \\ + & - & + & + \end{bmatrix}, \text{ and}$$

$$A^{(2)}_{(2\times 4)} = \begin{bmatrix} + & + & - & + \\ + & - & - & - \end{bmatrix}$$

In this case:

$$A^{(1)}_{(2\times 4)\oplus 3} = \begin{bmatrix} + & + & - & + \\ - & + & + & + \end{bmatrix}, \text{ and}$$

$$A^{(1)}_{(2\times 4)\oplus 1} = \begin{bmatrix} - & + & + & + \\ + & + & - & + \end{bmatrix}.$$

Figure 3A:
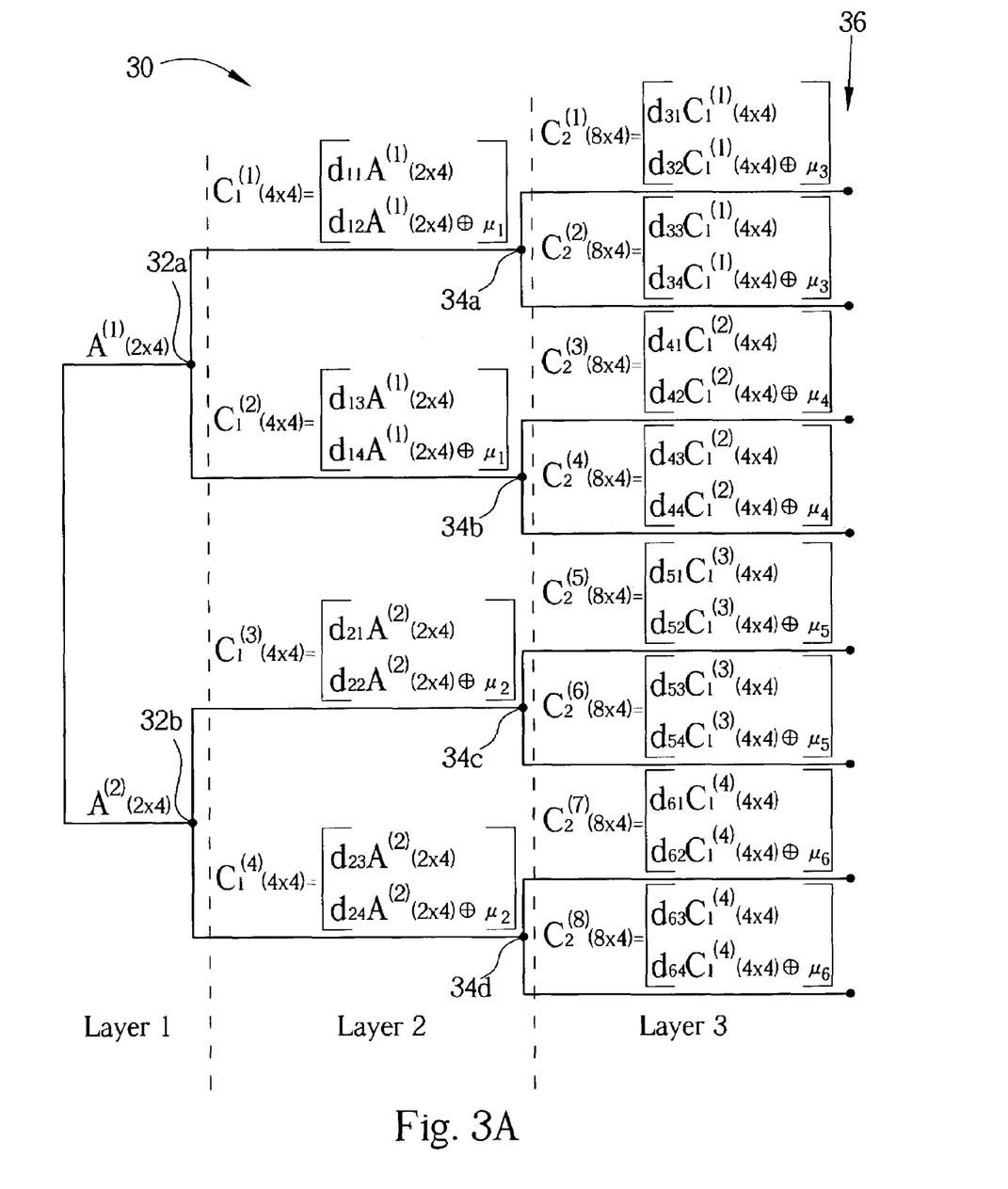
FIG. 3A illustrates an example fixed-length 2D-OVSF code tree for a first method of the embodiment of the invention.

Please refer to FIG. 3A, which is a fixed-length 2D-OVSF code tree 30 for the above example. For the code tree 30, it is assumed that $\mu_1=3$, $\mu_2=1$, and that matrices $D_1$ and $D_2$ are selected from the set D such that:

$$D_1 = D_2 = \begin{bmatrix} + & + \\ + & - \end{bmatrix}$$

Progenitor nodes 32*a* and 32*b* have respective associated 2D-OVSF matrices $A^{(1)}_{(2\times 4)}$ and $A^{(2)}_{(2\times 4)}$. To find the fixed-length 2D-OVSF matrices respectively associated with the child nodes 34*a* and 34*b* for the parent node 32*a* having associated matrix $A^{(1)}_{(2\times 4)}$, Eqns. 3A and 3B are utilized, yielding:

$$C_{1(4\times4)}^{(1)} = \begin{bmatrix} (+)A_{(2\times4)}^{(1)} \\ (+)A_{(2\times4)\oplus3}^{(1)} \end{bmatrix} = \begin{bmatrix} +++- \\ +-++ \\ ++-+ \\ -+++ \end{bmatrix}, \text{ and}$$

$$C_{1(4\times4)}^{(2)} = \begin{bmatrix} (+)A_{(2\times4)}^{(1)} \\ (-)A_{(2\times4)\oplus3}^{(1)} \end{bmatrix} = \begin{bmatrix} +++- \\ +-++ \\ --+- \\ +--- \end{bmatrix}$$

Similarly, the matrices associated with children node 34c and 34d are given by:

$$C_{1(4\times4)}^{(3)} = \begin{bmatrix} (+)A_{(2\times4)}^{(2)} \\ (+)A_{(2\times4)\oplus1}^{(2)} \end{bmatrix} = \begin{bmatrix} ++-+ \\ +--- \\ +++- \\ -+-- \end{bmatrix}, \text{ and}$$

$$C_{1(4\times4)}^{(4)} = \begin{bmatrix} (+)A_{(2\times4)}^{(2)} \\ (-)A_{(2\times4)\oplus1}^{(2)} \end{bmatrix} = \begin{bmatrix} ++-+ \\ +--- \\ ---+ \\ +-++ \end{bmatrix}$$

Overall, the entire set of the fixed-length 2D orthogonal codes according to the embodiment of the invention can be constructed by the above method "A". FIG. 3A also shows the general formula for the matrices associated with the grandchildren nodes 36 within generation layer 3. To find the matrices in layer 3, Eqns. 3A and 3B are employed at each child node 34a-34d.

The embodiment of the invention provides a second method for generating fixed-length 2D-OVSF code matrices, termed method "B". As in the above method "A", method "B" begins by providing a set of two or more initial 2×N 2D-OVSF matrices $\{A_{(2\times4)}^{(1)}, A_{(2\times4)}^{(2)}\}$. To obtain the fixed-length 2D orthogonal codes, the following relationship is reiterated:

$$A^{(4i-3)(2M\times N)} = \begin{bmatrix} d_{j1}A^{(2i-1)(M\times N)} \\ d_{j2}A^{(2i)(M\times N)\oplus\mu_1} \end{bmatrix}, \quad (\text{Eqn.4A})$$

$$A^{(4i-2)(2M\times N)} = \begin{bmatrix} d_{j3}A^{(2i-1)(M\times N)} \\ d_{j4}A^{(2i)(M\times N)\oplus\mu_1} \end{bmatrix}, \quad (\text{Eqn.4B})$$

$$A^{(4i-1)(2M\times N)} = \begin{bmatrix} d_{k1}A^{(2i)(M\times N)} \\ d_{k2}A^{(2i-1)(M\times N)\oplus\mu_2} \end{bmatrix}, \text{ and} \quad (\text{Eqn.4C})$$

$$A^{(4i)(2M\times N)} = \begin{bmatrix} d_{k3}A^{(2i)(M\times N)} \\ d_{k4}A^{(2i-1)(M\times N)\oplus\mu_2} \end{bmatrix} \quad (\text{Eqn.4D})$$

In the above, the term "i" ranges from 1 to M/2 in single integer steps; that is $i\in\{1, 2, \ldots, M/2\}$. The terms $\mu_t$ within the same layer (i.e., the same value of "M") must be all even integers (including zero), or all odd integers. Finally, the terms $d_{j1}, d_{j2}, d_{j3}$ and $d_{j4}$ are from any matrix $D_j$ from the set of matrices D. Similarly, the terms $d_{k1}, d_{k2}, d_{k3}$ and $d_{k4}$ are from any matrix $D_k$ from the set of matrices D. That is, $D_k$, $D_j \in D$. Please refer to FIG. 3B, which is a table that shows general 2D-OVDF codes generated according to method "B".

Figure 3B:
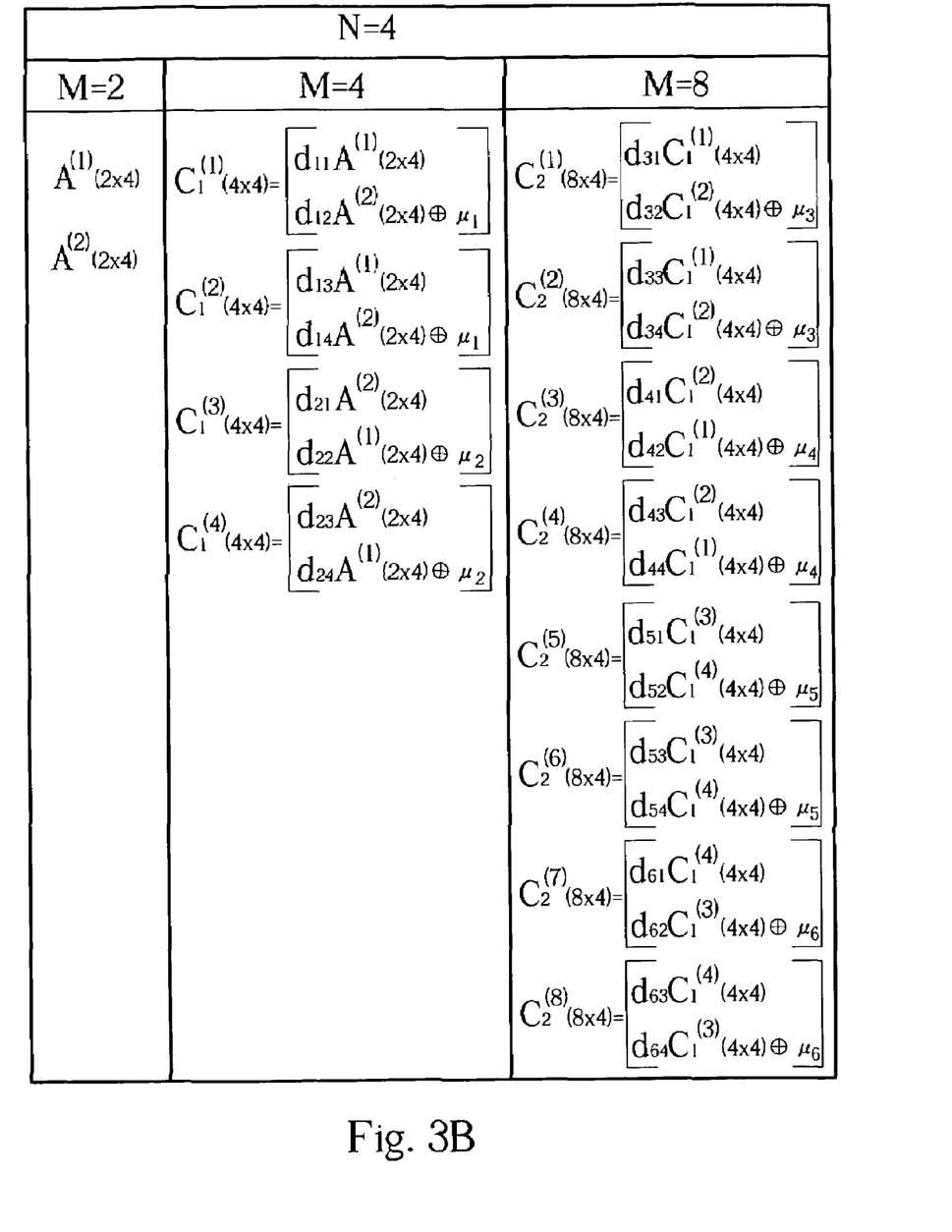
FIG. 3B is a table that shows general 2D-OVDF codes generated according to a method of the present invention.

Expanding the table of FIG. 3B out to higher orders of "M" (i.e, M=16, M=32, etc.) should be clear from the above discussion. As a particular example, it is possible that:

$$D_k = D_j = \begin{bmatrix} + & + \\ + & - \end{bmatrix}$$

Considering the case of M=4, and setting $\mu_1=\mu_1=0$, the above equations 4A, 4B, 4C and 4D yield:

$$C_{1\ (4\times4)}^{(1)} = \begin{bmatrix} (+)A^{(1)(2\times4)} \\ (+)A^{(2)(2\times4)} \end{bmatrix},$$

$$C_{1\ (4\times4)}^{(2)} = \begin{bmatrix} (+)A^{(1)(2\times4)} \\ (-)A^{(2)(2\times4)} \end{bmatrix},$$

$$C_{1\ (4\times4)}^{(3)} = \begin{bmatrix} (+)A^{(2)(2\times4)} \\ (+)A^{(1)(2\times4)} \end{bmatrix}, \text{ and}$$

$$C_{1\ (4\times4)}^{(4)} = \begin{bmatrix} (+)A^{(2)(2\times4)} \\ (-)A^{(1)(2\times4)} \end{bmatrix}.$$

In a similar vein, the matrices $C_2^{(i)}{}_{(8\times4)}$ are defined from Eqns. 4A, 4B, 4C and 4D in the above example as:

$$C_{2\ (8\times4)}^{(1)} = \begin{bmatrix} (+)C_1^{(1)(4\times4)} \\ (+)C_1^{(2)(4\times4)} \end{bmatrix},$$

$$C_{2\ (8\times4)}^{(2)} = \begin{bmatrix} (+)C_1^{(1)(4\times4)} \\ (-)C_1^{(2)(4\times4)} \end{bmatrix},$$

$$C_{2\ (8\times4)}^{(3)} = \begin{bmatrix} (+)C_1^{(2)(4\times4)} \\ (+)C_1^{(1)(4\times4)} \end{bmatrix},$$

$$C_{2\ (8\times4)}^{(4)} = \begin{bmatrix} (+)C_1^{(2)(4\times4)} \\ (-)C_1^{(1)(4\times4)} \end{bmatrix},$$

$$C_{2\ (8\times4)}^{(5)} = \begin{bmatrix} (+)C_1^{(3)(4\times4)} \\ (+)C_1^{(4)(4\times4)} \end{bmatrix},$$

$$C_{2\ (8\times4)}^{(6)} = \begin{bmatrix} (+)C_1^{(3)(4\times4)} \\ (-)C_1^{(4)(4\times4)} \end{bmatrix},$$

$$C_{2\ (8\times4)}^{(7)} = \begin{bmatrix} (+)C_1^{(4)(4\times4)} \\ (+)C_1^{(3)(4\times4)} \end{bmatrix}, \text{ and}$$

$$C_{2\ (8\times4)}^{(8)} = \begin{bmatrix} (+)C_1^{(4)(4\times4)} \\ (-)C_1^{(3)(4\times4)} \end{bmatrix}.$$

The entire set of the fixed-length 2D orthogonal codes according to the embodiment of present invention can be constructed by the above method "B". However, when using method "B" to construct a 2D-OVSF code tree, the 2D-OVSF codes at different layers do not maintain orthogonality, and so cannot be used simultaneously.

However, with both the first and second fixed-length code construction methods, fixed-length 2D-OVSF codes can be constructed that maintain orthogonality at the same layer.

To deliver multirate transmissions, one of two approaches are typically employed in a third generation communications system: a multicode scheme, or a variable length scheme. When utilizing the multicode scheme, a base station allocates one or more spreading codes to an individual user to speed up the data rate. When users are allocated additional spreading codes, their data rates become higher. Since the 2D-OVSF codes generated by the embodiment of present invention maintain orthogonality at the same generation layer, multiple 2D-OVSF codes can be applied to provide higher data rates.

The variable-length scheme has been applied in the use of 1D-OVSF codes for third-generation communications systems. In the variable-length scheme, the base station allocates different lengths of spreading codes to different users according to the data rates required by these users. When a user gets a shorter spreading code, the user obtains a higher corresponding data rate. Each user, however, is allocated only one spreading code. As variable lengths of spreading codes are required, only the first class of 2D-OVSF code trees as introduced in the discussion of FIG. 2 is used for variable-length schemes. Nevertheless, multirate transmissions can be achieved by way of the variable-length technique when used in MC-DS/CDMA systems.

Figure 4:
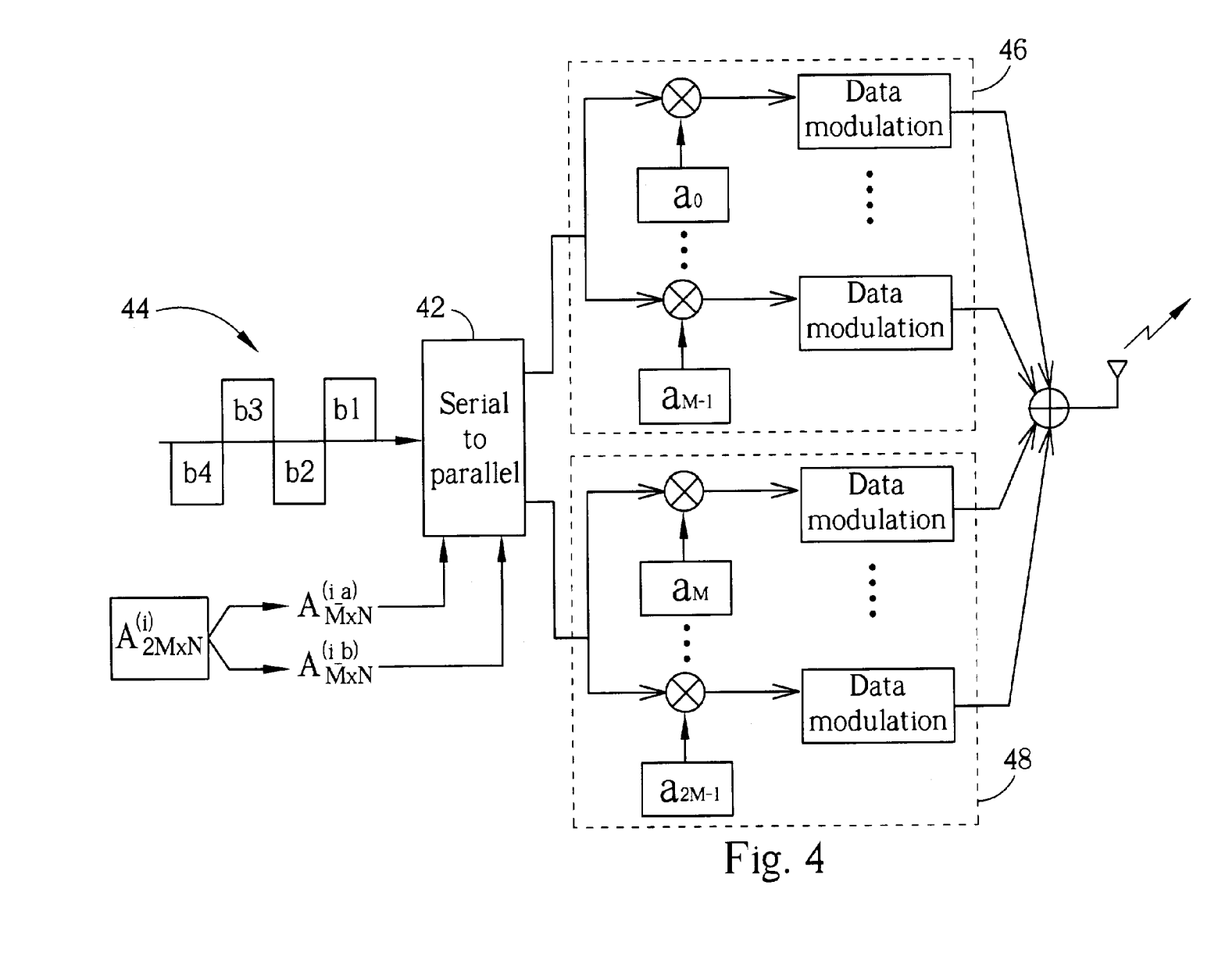
FIG. 4 depicts a separated-carrier approach to multirate transmissions according to the embodiment of the invention.

The embodiment of present invention proposes a new, third approach for multirate transmissions, which is being termed "separated-carrier". In this separated-carrier scheme, the second class of 2M×N 2D codes $A^{(i)}{}_{(2M\times N)}$ are separated into two (or more) codes having the same length but a fewer number of carriers, $A^{(i\_a)}{}_{(M\times N)}$ and $A^{(i\_b)}{}_{(M\times N)}$. For example, one 4×8 2D-OVSF code can be separated into two 2×8 2D-OVSF codes. By using two spreading codes, $A^{(i\_a)}{}_{(M\times N)}$ and $A^{(i\_b)}{}_{(M\times N)}$, a user can obtain double data rates. This third approach is depicted in FIG. 4. An initial 2D-OVSF matrix $A^{(i)}{}_{(2M\times N)}$ is separated into two distinct matrices $A^{(i\_a)}{}_{(M\times N)}$ and $A^{(i\_b)}{}_{(M\times N)}$. The first 2D-OVSF matrix $A^{(i\_a)}{}_{(M\times N)}$ has M rows, which are 1×N spreading code vectors, and are labeled $a_0$ to $a_{m-1}$. The second 2D-OVSF matrix $A^{(i\_b)}{}_{(M\times N)}$ also has M rows, which are the 1×N spreading code vectors $a_m$ to $a_{2m-1}$. The 2D-OVSF matrices $A^{(i\_a)}{}_{(M\times N)}$ and $A^{(i\_b)}{}_{(M\times N)}$ are then provided to a serial-to-parallel conversion circuit 42, that also accepts a serial stream of user data bits 44, and generates two parallel output streams 46 and 48. Parallel output stream 46 and 48 perform data encoding and modulation utilizing the first 2D-OVSF matrix $A^{(i\_a)}{}_{(M\times N)}$ and the second 2D-OVSF matrix $A^{(i\_b)}{}_{(M\times N)}$ Respectively. With regards to separating the initial 2D-OVSF matrix $A^{(i)}{}_{(2M\times N)}$, a following specific example is made with reference to FIG. 3A. It is noted that $A^{(1)}{}_{(2\times 4)}$ is the parent code of $C_1^{(1)}{}_{(4\times 4)}$, $C_1^{(2)}{}_{(4\times 4)}$, $C_2^{(1)}{}_{(8\times 4)}$, $C_2^{(2)}{}_{(8\times 4)}$, $C_2^{(3)}{}_{(8\times 4)}$ and $C_2^{(4)}{}_{(8\times 4)}$. When $A^{(1)}{}_{(2\times 4)}$ is used, its children codes can not be used simultaneously as they are not mutually orthogonal with each other. However, codes at the same layer (sibling codes, such as the codes $C_1^{(1)}{}_{(4\times 4)}$ and $C_1^{(2)}{}_{(4\times 4)}$ in Layer 2) can be used at the same time, so long as the parent is not in use. Such utilization of sibling codes is known in the prior art. With regards to the specific present example case, consider the example used above in which:

$$A^{(1)(2\times 4)} = \begin{bmatrix} ++++- \\ +--++ \end{bmatrix}, \text{ and}$$

-continued $$A^{(2)(2\times 4)} = \begin{bmatrix} ++-+ \\ +--- \end{bmatrix}.$$

Consequently, and as previously explained, $$C_{1\,(4\times 4)}^{(1)} = \begin{bmatrix} (+)A^{(1)(2\times 4)} \\ (+)A^{(2)(2\times 4)\oplus 3} \end{bmatrix} = \begin{bmatrix} +++- \\ +-++ \\ ++-+ \\ -+++ \end{bmatrix} = \begin{bmatrix} A^{(1a)(2\times 4)} \\ A^{(1b)(2\times 4)} \end{bmatrix}$$

That is, $C_1^{(1)}{}_{(4\times 4)}$ can be cut into two separate codes, providing a code set $(A^{(1a)}{}_{(2\times 4)}, A^{(1b)}{}_{(2\times 4)})$, where:

$$A^{(1a)(2\times 4)} = \begin{bmatrix} + & + & + & - \\ + & - & + & + \end{bmatrix}, \text{ and}$$

$$A^{(1b)(2\times 4)} = \begin{bmatrix} + & + & - & + \\ - & + & + & + \end{bmatrix}.$$

The codes $A^{(1a)}{}_{(2\times 4)}$ and $A^{(1b)}{}_{(2\times 4)}$ are orthogonal, and when assigned to a MS-DC/CDMA enabled device to serve as signature sequences of the device, provide increased data transmission rates to the device. The code set $(A^{(1a)}{}_{(2\times 4)}, A^{(1b)}{}_{(2\times 4)})$ of the embodiment is different from the prior art code set $(A^{(1)}{}_{(2\times 4)}, A^{(2)}{}_{(2\times 4)})$. As noted, when $A^{(1)}{}_{(2\times 4)}$ and $A^{(2)}{}_{(2\times 4)}$ are used, their children codes $C_1^{(1)}{}_{(4\times 4)}$, $C_1^{(2)}{}_{(4\times 4)}$, $C_1^{(3)}{}_{(4\times 4)}$ and $C_1^{(4)}{}_{(4\times 4)}$ can no simultaneously used. However, when the code set $(A^{(1a)}{}_{(2\times 4)}, A^{(1b)}{}_{(2\times 4)})$ is in use, $C_1^{(3)}{}_{(4\times 4)}$ and $C_1^{(4)}{}_{(4\times 4)}$ can still be used by other users. Consequently, the user data rates are increased, while providing codes that may be simultaneously used by other users.

Furthermore, the spreading codes $A_{(M\times N)}$ can be separated into $2^{m-1}$ $A_{(2\times N)}$ 2D-OVSF matrices (for $M=2^m$). For this reason, by reiterating the above method, data rates that are $2^{m-1}$ times higher than the original can be achieved. Additionally, the M×N 2D-OVSF codes separated-carrier scheme not only maintain orthogonality of the codes, but also possess zero cyclic auto-correlation and cross-correlation properties.

Consequently, such codes are capable of remaining orthogonal in MC-DS/CDMA systems with asynchronous channels.

The separated codes of $A^{(i)}{}_{(2M\times N)}$, which are $A^{(i\_a)}{}_{(M\times N)}$ and $A^{(i\_b)}{}_{(M\times N)}$, are orthogonal to $A^{(j)}{}_{(2M\times N)}$ if and only if the parent code of $A^{(j)}{}_{(2M\times N)}$ is not equal to the parent code of $A^{(i)}{}_{(2M\times N)}$. For example, assume that the 2D-OVSF code matrix $A^{(1)}{}_{(8\times 8)}$ is separated into $A^{(1a)}{}_{(4\times 8)}$ and $A^{(1b)}{}_{(4\times 8)}$. Further assume that $A^{(1)}{}_{(8\times 8)}$ and $A^{(2)}{}_{(8\times 8)}$ have the same parent 2D-OVSF code matrix. Then, $A^{(1a)}{}_{(4\times 8)}$ and $A^{(1b)}{}_{(4\times 8)}$ are both orthogonal to the general-case $A^{(j)}{}_{(8\times 8)}$ for $j=\{3, \ldots, 8\}$. However, $A^{(1a)}{}_{(4\times 8)}$ and $A^{(1b)}{}_{(4\times 8)}$ are not orthogonal to $A^{(1)}{}_{(8\times 8)}$ and $A^{(2)}{}_{(8\times 8)}$.

When $A^{(1a)}{}_{(4\times 8)}$ and $A^{(1b)}{}_{(4\times 8)}$ are allocated to an individual user to obtain double data rates for that user, $A^{(1)}{}_{(8\times 8)}$ and $A^{(2)}{}_{(8\times 8)}$ are no longer usable for other users. The first two new classes of 2D-OVSF codes of the embodiment can be used to employ the separated-carrier scheme to support multirate transmission.

The embodiment of present invention also proposes a new "variable-carrier" scheme, which is suitable for the special construction of the second class of fixed-length 2D-OVSF codes. As previously explained, the fixed-length 2D orthogonal codes that are constructed by method "A" are tree-structured. Similar to 1D-OVSF codes, the fixed-length 2D-OVSF codes at different layers are orthogonal if and only if one is not the parent code of another. Because the fixed-length 2D-OVSF codes of different carriers maintain orthogonality, they can be allocated to different users simultaneously.

Figure 5:
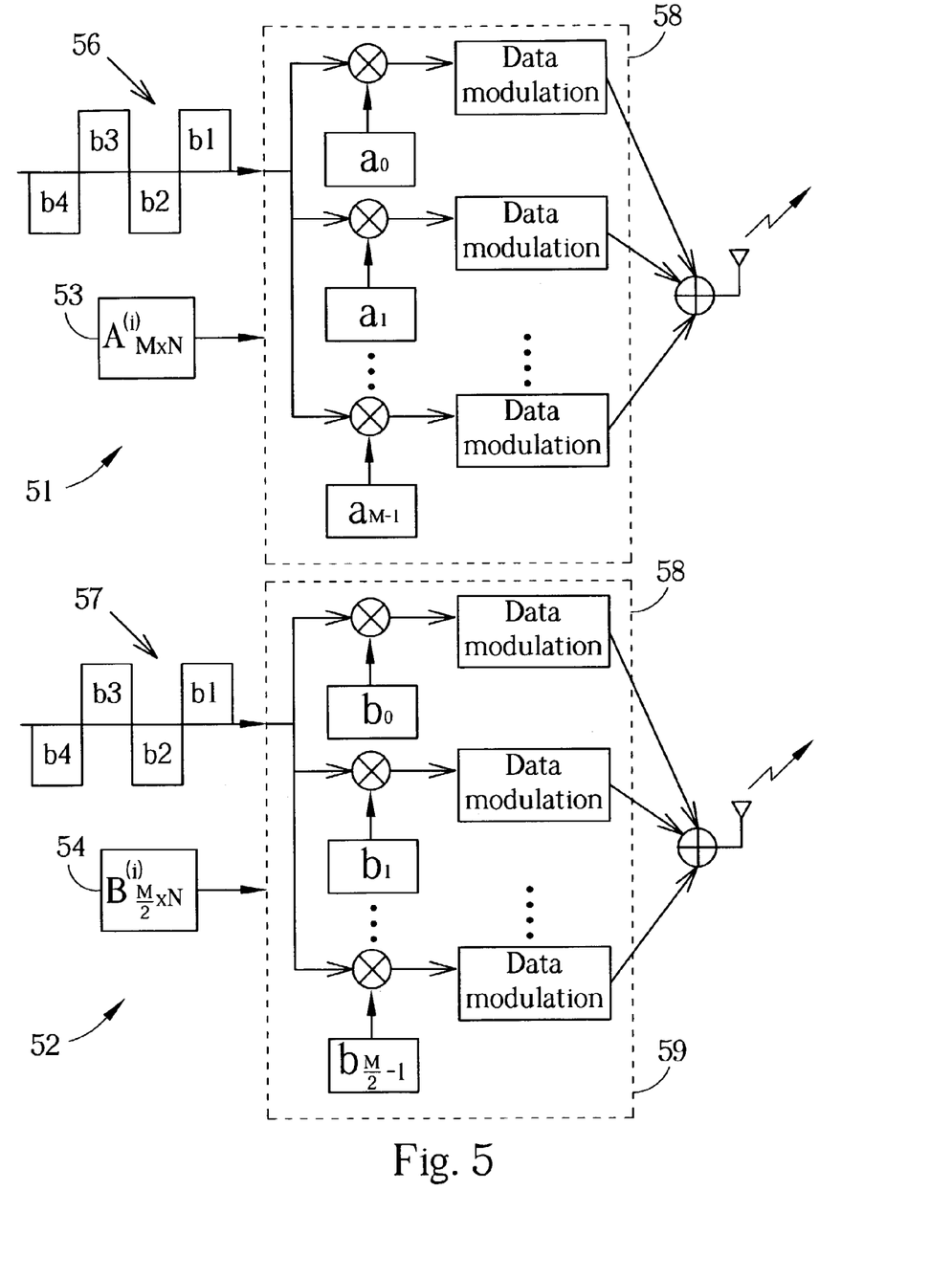
FIG. 5 depicts a variable-carrier approach to multirate transmissions according to the embodiment of the invention.

Please refer to FIG. 5, which is a diagram illustrating the variable-carrier scheme. Initially, a fixed-length 2D-OVSF code tree is generated as per method "A". Because of different hardware designs, different types of user handsets may support different numbers of carriers. From the standpoint of the vendors of these handsets, the base stations should be able to provide wireless services for these different hardware designs. Hence, it is necessary to have the ability to provide fixed-length codes that have different numbers of carriers, and this is provided by the code tree generated by method "A". Assuming that a first user handset 51 supports M carriers, and that a second user handset 52 supports M/2 carriers, two matrices are selected from the fixed length 2D-OVSF code tree: a matrix $A^{(i)}_{(M \times N)}$ 53, which is provided to the first user handset 51, and a second matrix $B^{(j)}_{((M/2) \times N)}$ 54, which is provided to the second user handset 52. An encoding a modulation unit 58 of the first user handset 51 accepts a data stream 56, which is encoded and modulated for transmission by way of the matrix $A^{(i)}_{(M \times N)}$ 53. Encoding a modulation unit 59 of the second user handset 52 accepts a data stream 57, which is encoded and modulated for transmission by way of the matrix $B^{(j)}_{((M/2) \times N)}$. The embodiment of present invention offers adaptability with regards to the number of carriers supported by the system.

As with 1D-OVSF codes, code blocking occurs for variable-carrier scheme. When a 2D-OVSF code matrix is applied to a user handset, all parent and child matrices associated with that matrix are rendered unusable, and cannot be simultaneously allocated to other user handsets. Additionally, the variable-carrier scheme cannot support multirate transmissions, since users who are provided different spreading codes with different numbers of carriers but the same code length are provided the same data rates.

Finally, code matrices generated by the code trees possess zero cyclic auto-correlation and cross-correlation properties. These 2D-OVSF codes are thus capable of remaining orthogonal in asynchronous channels, and so a two-layered spreading technique is not needed.

The embodiment of present invention may be practiced on any sort of wireless device, such as a mobile handset, a base station, a computing platform, etc. Typically, it maybe carried out dynamically within the wireless device by way of a processor and a suitably designed computer program, the design of which should be obvious to one reasonably skilled in the art given the above detailed description. Alternatively, pre-computed 2D-OVSF codes that are generated and provided hierarchical associations according to the embodiment of present invention may be installed into the wireless device and used accordingly.

Those skilled in the art will readily observe that numerous modifications and alterations of the device may be made while retaining the teachings of the present invention. Accordingly, the above disclosure should be construed as limited only by the metes and bounds of the appended claims.

What is claimed is:

1. A method for generating 2d OVSF codes serving as signature sequences used in a CDMA system comprising the steps of:
   generating a code tree of two-dimensional orthogonal variable spreading factor (2D-OVSF) codes, each node of said code tree having a corresponding matrix;
   selecting a first matrix from said node of said code tree;
   utilizing said first matrix to provide a signature sequence;
   separating said first matrix into a second matrix and a third matrix; and
   assigning said second and third matrix to a CDMA-enabled device serving as signature sequences.

2. The method as recited in claim 1, wherein said generating step comprises:
   providing a plurality of seed matrices which are respectively assigned to a plurality of progenitor nodes of said code tree;
   providing a plurality of mapping matrices; and
   generating a plurality of children nodes from said progenitor nodes in said code tree, each of said children nodes having a product matrix by multiplying said seed matrix and said mapping matrix.

3. The method as recited in claim 2, wherein said seed matrix is defined by $A^{(i)}_{(M1 \times N1)}$, said (i) between 1 and K1.

4. The method as recited in claim 2, wherein said mapping matrix is defined by $B^{(j)}_{(M2 \times N2)}$, said (j) between 1 and K2.

5. The method as recited in claim 2, wherein said product matrix is defined by reiterating the relationship:

$$C^{((i-1)K2+j)} = B^{(j)}_{(M2 \times N2)} \oplus A^{(i)}_{(M1 \times N1)}.$$

6. The method as recited in claim 1, wherein said second and third matrix is defined by (M/2)×N.

7. A method for generating 2d OVSF codes serving as signature sequences used in a CDMA system comprising the steps of:
   generating a code tree of two-dimensional orthogonal variable spreading factor (2D-OVSF) codes, each node of said code tree having a corresponding matrix;
   selecting a first matrix from said node of said code tree;
   separating said first matrix into a second matrix and a third matrix; and
   utilizing said first matrix, said second matrix, and said third matrix providing signature sequences to the first CDMA-enabled device.

8. The method as recited in claim 7, wherein said generating step comprises:
   providing a plurality of seed matrices, which are respectively assigned to each of progenitor nodes of said code tree;
   providing a plurality of mapping matrices; and
   generating two children nodes from at least one said progenitor node, each of said children nodes having a product matrix by multiplying said seed matrix and said mapping matrix.

9. The method as recited in claim 8, wherein said seed matrix is defined by $A^{(i)}_{(M \times N)}$, said (i) between 1 and K1.

10. The method as recited in claim 8, wherein said mapping matrix is defined by $D_j$ given as $$\begin{bmatrix} d_{j1} & d_{j3} \\ d_{j2} & d_{j4} \end{bmatrix},$$

and said $d_{j1}, d_{j2}, d_{j3}$ and $d_{j4}$ are +1 or −1.

11. The method as recited in claim 8, wherein said product matrix is defined by reiterating the relationship:

$$C^{(2i-1)}{}_{(2M \times N)} = \begin{bmatrix} d_{j1} A^{(i)(M \times N)} \\ d_{j2} A^{(i)(M \times N) \oplus \mu_i} \end{bmatrix}; \text{ and}$$

$$C^{(2i)}{}_{(2M \times N)} = \begin{bmatrix} d_{j3} A^{(i)(M \times N)} \\ d_{j4} A^{(i)(M \times N) \oplus \mu_i} \end{bmatrix}.$$

12. The method as recited in claim 7, wherein said first matrix is defined by M×N.

13. The method as recited in claim 7, wherein said second and third matrix is defined by (M1/2)×N1.

14. The method as recited in claim 7 further comprising:
selecting a M2×N1 matrix from said child nodes, said M2×N1 matrix orthogonal to said first M1×N1 matrix; and
assigning said M2×N1 matrix to the second CDMA-enabled device.

15. A method for generating 2d OVSF codes serving as signature sequences used in a CDMA system comprising the steps of:
generating an hierarchical code structure of two-dimensional orthogonal variable spreading factor (2D-OVSF) codes;
selecting a M1×N1 matrix from said hierarchical code structure;
assigning said M1×N1 matrix to the first MC-DS/CDMA-enabled device serving as first signature sequence;
selecting a M2×N1 matrix from said hierarchical code structure, said M2×N1 matrix orthogonal to said M1×N1 matrix; and
assigning said M2×N1 matrix to the second CDMA-enabled device serving as second signature sequence.

16. The method as recited in claim 15, wherein said generating step comprises:
providing a plurality of seed matrices and a plurality of mapping matrices; and
generating at least two children subsequent generation codes, each of said children subsequent generation codes having a product matrix by multiplying said seed matrix and said mapping matrix.

17. The method as recited in claim 16, wherein said two children subsequent generation codes are defined by $C^{(4i-1)}{}_{(2M \times N)}$ and $C^{(4i)}{}_{(2M \times N)}$ respectively.

18. The method as recited in claim 16, wherein said seed matrices are $A^{(2i)}{}_{(M \times N)}$ and $A^{(2i-1)}{}_{(M \times N)}$, and said (2i) is between 2 and K1.

19. The method as recited in claim 16, wherein said mapping matrix is $D_j$ given as $$\begin{bmatrix} d_{j1} & d_{j3} \\ d_{j2} & d_{j4} \end{bmatrix},$$

and said $d_{j1}, d_{j2}, d_{j3}$ and $d_{j4}$ are +1 or −1, where $d_{j1}d_{j3} + d_{j2}d_{j4} = 0$.

20. The method as recited in claim 16, wherein said product matrix is defined by reiterating the relationship:

$$C^{(4i-3)}{}_{(2M \times N)} = \begin{bmatrix} d_{k1} A^{(2i-1)(M \times N)} \\ d_{k2} A^{(2i)(M \times N) \oplus \mu_i} \end{bmatrix};$$

$$C^{(4i-2)}{}_{(2M \times N)} = \begin{bmatrix} d_{k3} A^{(2i-1)(M \times N)} \\ d_{k4} A^{(2i)(M \times N) \oplus \mu_i} \end{bmatrix};$$

$$C^{(4i-1)}{}_{(2M \times N)} = \begin{bmatrix} d_{k1} A^{(2i)(M \times N)} \\ d_{k2} A^{(2i-1)(M \times N) \oplus \mu_i} \end{bmatrix}; \text{ and}$$

$$C^{(4i)}{}_{(2M \times N)} = \begin{bmatrix} d_{k3} A^{(2i)(M \times N)} \\ d_{k4} A^{(2i-1)(M \times N) \oplus \mu_i} \end{bmatrix};$$

wherein i=1, 2, . . . , (M/2).

* * * * *